United States Patent [19]

Macleod et al.

[11] Patent Number: 6,081,660

[45] Date of Patent: Jun. 27, 2000

[54] METHOD FOR FORMING A COHORT FOR USE IN IDENTIFICATION OF AN INDIVIDUAL

[75] Inventors: Iain Donald Graham Macleod, Cook; John Bruce Millar, Hawker, both of Australia; Fangxin Chen, Edmonton; William Laverty, Saskatoon, both of Canada

[73] Assignee: The Australian National University, Australia

[21] Appl. No.: 08/849,380

[22] PCT Filed: Dec. 1, 1995

[86] PCT No.: PCT/AU95/00807

§ 371 Date: Aug. 25, 1997

§ 102(e) Date: Aug. 25, 1997

[87] PCT Pub. No.: WO96/17341

PCT Pub. Date: Jun. 6, 1996

[51] Int. Cl.[7] .................................................. G10L 5/06
[52] U.S. Cl. .................... 395/500.23; 704/240; 704/250; 704/255
[58] Field of Search .................... 364/578; 704/231, 704/236, 240, 246–257, 232; 381/41–43; 706/20, 25, 28; 395/500.23; 340/825.3, 825.34; 380/1

[56] References Cited

U.S. PATENT DOCUMENTS

| | | |
|---|---|---|
| 4,897,878 | 1/1990 | Boll et al. .................................. 381/43 |
| 4,910,782 | 3/1990 | Watari ....................................... 381/42 |
| 5,271,088 | 12/1993 | Bahler ........................................ 395/2 |
| 5,303,299 | 4/1994 | Hunt et al. ................................. 379/88 |
| 5,307,444 | 4/1994 | Tsuboka ..................................... 395/22 |
| 5,414,755 | 5/1995 | Bahler et al. ............................. 379/67 |
| 5,548,647 | 8/1996 | Naik et al. ................................ 381/42 |
| 5,864,810 | 1/1999 | Digalakis et al. ....................... 704/255 |

FOREIGN PATENT DOCUMENTS

| | | | |
|---|---|---|---|
| 0 388 067 A2 | 9/1990 | European Pat. Off. .......... G10L 5/06 |
| 0 424 071 A2 | 4/1991 | European Pat. Off. .......... G10L 5/06 |
| WO 86/05618 | 9/1986 | WIPO .............................. G10L 5/06 |
| WO 94/22132 | 9/1994 | WIPO .............................. G10L 5/06 |

OTHER PUBLICATIONS

Chen, Fangxin, et al., "Hybrid Threshold Approach In Text–Independent Speaker Verification," Research School of Information Sciences and Engineering. Australian National University, pp. 79–82.

Millar, J. Bruce, et al. "Overview of Speaker Verification Studies Towards Technology For Robust User–Conscious Secure Transactions," Research School of Information Sciences and Engineering, Australian National University.

(List continued on next page.)

*Primary Examiner*—Kevin J. Teska
*Assistant Examiner*—Russell W. Frejd
*Attorney, Agent, or Firm*—Seed And Berry, LLP

[57] ABSTRACT

A method of forming a cohort for use in identification of an individual by comparing a model of characteristics of the individual, such as a model of utterances, with models of the cohort including a model for the client in respect of whom it is desired to test whether the individual is identifiable. Models related to the population excluding the client are tested to determine whether they meet an acceptance threshold test as to identify with a model for the client. Then, from each meeting the threshold test, it is determined whether those models are distributed so as to present at least a substantial probability that models for nonmembers of the population spaced from the client model in all directions will each be closer to a member of the cohort, excluding the client, than to the client. If that probability is less than a predetermined value, a selection is made from the population of another cohort member which will reduce that probability. Alternatively, if the mentioned probability is less than the predetermined value, a "phantom" model is generated for inclusion in the population and which will reduce that probability. The method may employ both the described selection and "phantom" generation techniques.

26 Claims, 8 Drawing Sheets

OTHER PUBLICATIONS

Millar, J. Bruce, et al. "The Efficacy of Cohort Normalisation In A Speaker Verification Task Under Different Types of Speech Signal Variance," Research School of Information Sciences and Engineering, Australian National University.

Hawkins, Simon, et al. "Modelling Individual Speaker Characteristics By Descriving A Speaker's Vowel Distribution In Articulatory, Cepstral and Formant Space," Computer Sciences Laboratory, Research School of Information Sciences and Engineering, Australian National University, pp. 342–347.

Rosenberg, Aaron E., et al. "The Use of Cohort Normalized Scores For Speaker Verification," Speech Research Department, AT&T Bell Laboratories, pp. 599–602.

Davis, Steven B. and Paul Mermelstein, "Comparison Of Parametric Representations For Monosyllabic Word Recognition In Continuously Spoken Sentences," *IEEE Transactions On Acoustics, Speech and Signal Processing*, ASSP–28, pp. 357–366, 1980.

X. Yang, J. Millar and I. Macleod, On the Sources of Inter– & Intra–Speaker Variability in the Acoustic Dynamics of Speech, IEEE, 4th Int'l Conf. on Spoken Language, 1996, ICSLP '96, vol. 3, pp. 1792–1795.

P. Mousty et al., The Role of Neighborhood Relative Frequency in Spoken Word Recognition, IEEE, 4th Int'l Conf. on Spoken Language, 1996, ICSLP '96, vol. 4, pp. 2498–2501.

| Client | Abs_VQ | Min1 | Sel1 | Min2 | Sel2 | Min3 | Sel3 | Min4 | Sel4 | Min5 | Sel5 | Sel5' |
|---|---|---|---|---|---|---|---|---|---|---|---|---|
| 1 | 2.46 | 4.99 | 4.99 | 3.39 | 1.29 | 0.70 | 0.71 | 0.60 | 0.62 | 0.16 | 0.56 | 0.56 |
| 2 | 11.05 | 30.34 | 30.34 | 15.39 | 23.72 | 12.01 | 9.39 | 10.62 | 8.23 | 9.39 | 8.24 | 8.23* |
| 3 | 11.38 | 23.63 | 23.63 | 18.21 | 17.12 | 14.70 | 14.90 | 11.19 | 9.32 | 9.39 | 8.79 | 8.79 |
| 4 | 4.74 | 3.56 | 3.56 | 3.56 | 2.48 | 1.10 | 2.38 | 0.71 | 1.77 | 0.62 | 1.72 | 1.72 |
| 5 | 1.18 | 3.37 | 3.37 | 3.52 | 2.36 | 2.38 | 3.54 | 2.33 | 3.52 | 2.93 | 3.49 | 3.49 |
| 6 | 3.54 | 3.70 | 3.70 | 3.80 | 3.65 | 2.89 | 3.52 | 2.44 | 3.42 | 2.31 | 2.86 | 2.86 |
| 7 | 5.29 | 4.69 | 4.69 | 0.59 | 2.55 | 0.50 | 2.28 | 0.45 | 1.69 | 0.11 | 0.57 | 0.57 |
| 8 | 1.77 | 3.49 | 3.49 | 3.52 | 3.49 | 5.43 | 3.43 | 4.78 | 3.03 | 4.27 | 3.09 | 3.03* |
| 9 | 1.30 | 0.64 | 0.64 | 0.64 | 0.64 | 0.62 | 0.62 | 0.75 | 0.62 | 0.62 | 0.64 | 0.62* |
| 10 | 3.98 | 1.17 | 1.17 | 1.76 | 1.77 | 0.58 | 1.26 | 0.59 | 1.13 | 0.51 | 0.53 | 0.53 |
| 11 | 10.13 | 3.64 | 3.64 | 2.47 | 1.16 | 1.62 | 1.19 | 1.31 | 0.70 | 1.31 | 0.66 | 0.66 |
| 12 | 2.93 | 10.60 | 10.60 | 1.88 | 4.11 | 1.72 | 2.34 | 1.18 | 1.66 | 1.75 | 1.18 | 1.18 |
| 13 | 1.79 | 8.24 | 8.24 | 2.92 | 6.41 | 2.78 | 5.17 | 1.77 | 3.54 | 1.77 | 2.33 | 2.33 |
| 14 | 6.47 | 1.18 | 1.18 | 1.18 | 1.18 | 1.18 | 1.18 | 1.18 | 1.18 | 1.16 | 1.16 | 1.16 |
| 15 | 7.03 | 9.83 | 9.83 | 9.41 | 5.28 | 7.11 | 5.17 | 7.69 | 5.15 | 8.03 | 5.57 | 5.57 |
| 16 | 3.51 | 3.51 | 3.51 | 2.34 | 2.31 | 2.33 | 2.31 | 2.28 | 2.36 | 2.25 | 1.77 | 1.77 |
| 17 | 5.88 | 11.51 | 11.51 | 7.11 | 8.46 | 6.46 | 5.82 | 4.72 | 4.47 | 4.19 | 4.11 | 4.11 |
| 18 | 10.03 | 5.34 | 5.34 | 0.47 | 0.64 | 0.11 | 0.62 | 0.06 | 0.05 | 0.06 | 0.05 | 0.05 |
| 19 | 11.78 | 11.10 | 11.10 | 4.74 | 8.84 | 6.38 | 5.31 | 5.60 | 3.63 | 4.15 | 4.10 | 3.52* |
| 20 | 4.83 | 11.51 | 11.51 | 8.99 | 8.24 | 8.71 | 6.91 | 8.54 | 5.95 | 7.92 | 6.02 | 5.87* |
| Mean | 5.55 | 7.80 | 7.80 | 4.79 | 5.29 | 3.97 | 3.90 | 3.44 | 3.09 | 3.15 | 2.87 | 2.83 |

*Figure 3*

```
/*--------------------------------------------------------------------*/
/* Codeword Mixer                                                     */
/*--------------------------------------------------------------------*/
/*                                                                    */
/*--------------------------------------------------------------------*
/*                                                                    */
/*                                                                    */
/*                                                                    */
/*--------------------------------------------------------------------*/ include <stdio.h>
include <stdlib.h>
#include <string.h>
#include <math.h>
#include "proto.h"

#define   K      15        /* Dimension of vector */
#define   Nsize  128       /* Codebook size */
#define   Mnf    12        /* Minimum number of frames */
/*--------------------------------------------------------------------*/
int main(int argc,char *argv[])
{
    /*--------------------------------------------------------------------*/
    /* Variables                                                          */
    /*--------------------------------------------------------------------*/
    FILE    *testfile, *wcodefile, *weifile, *stream;
    int     Nf,id,i,j,n,ii,m,num=0,correct=0, Icode[Nsize], Ccode[200];
    float   MFCC[Nsize][K],codebook1[Nsize][K];
    float   codebook[Nsize][K], AA[15];
    float   dis,fmin,vq_error,dummy,wei[K],percent;
    char    filename[30],cb[20],nn[200], ch[30];
    /*--------------------------------------------------------------------*/
    /* Read inputs                                                        */
    /*--------------------------------------------------------------------*/
    AA[0]=1.500260;
    AA[1]=-1.546811;
    AA[2]=-0.205271;
    AA[3]=0.466673;
    AA[4]=0.535951;
    AA[5]=1.017841;
    AA[6]=-0.789567;
    AA[7]=0.596287;
    AA[8]=-0.492664;
    AA[9]=0.135963;
    AA[10]=-0.180469;
    AA[11]=-0.224845;
    AA[12]=0.252975;
    AA[13]=-0.634357;
    AA[14]=0.379529;

if(argc < 2)
    {
      printf("Usage:      vq testfile\n");
      exit(1);
    }
```

*Fig. 4A*

```
id=atoi(argv[1]);
printf("id:%i\n",id);
for(m=2;m<argc;m++)
{
 if((testfile = fopen(argv[m],"r")) == NULL)
 {
  printf("Error opening file %s !\n",argv[m]);
  continue;
 }
 Nf=filelength(argv[m])/(sizeof(float)*K);
 sprintf(filename, "%s=,basename(argv[m]));

if(Nf <= Mnf)
 {
  printf("File %s is shorter than %d frames, not be tested.\n*,filename,Mnf);
  fclose(testfile);
  continue;
 } num++;
/*   MFCC = float_matrix-2D(Nf,K); */
   fread((void *)&MFCC[0][0],sizeof(float),Nf*K,testfile);

fclose(testfile);

sprintf(nn, "wcode%d.128",id);

if((wcodefile = fopen(nn,"r")) == NULL)
   {
    printf("Error opening file %s !\n",cb);
    exit(1);
   } fread((void *)&codebook[0][0],sizeof(float),Nsize*K,wcodefile);
   fclose(wcodefile);

if((weifile = fopen("mfcc.wei","r")) == NULL)
   {
    printf(*Error opening file mfcc.wei !\n");
    exit(1);
   }
   for(j=0;j<K;j++)
    fscanf(weifile,"%f",&wei[j]);
   fclose(weifile);

/*-------------------------------------------------------------------*/
/* Calculate quantization errors                                     */
/*-------------------------------------------------------------------*/ vq_error=0.0;
   for(n=0;n<Nf;n++)
   {
       fmin=0.0;
       Icode[n]=0;
```

*Fig. 4B*

```
    for(j=0;j<K;j++)
    fmin+=(MFCC[n][j]-codebook[0][j])*(MFCC[n][j]-codebook[0][j])*wei[j];

fmin=sqrt(fmin)/K;
    for(ii-1;ii<Nsize;ii++)
     {
       dis=0.0;
       for(j=0;j<K;j++)
       dis+=(MFCC[n][j]-codebook[ii][j])*(MFCC[n][j]-codebook[ii][j])*wei[j];
       dis=sqrt(dis)/K;
       if(dis < fmin)
         {
            fmin=dis;
            Icode[n]=ii;
         }

}

}

}
/*    for(ii=0;ii<Nsize;ii++)
      for(j=0;j<15; j++)
    {
    codebook1[ii][j]=MFCC[ii][j];
    }
*/
    for(j=0;j<15;j++)
     { for(n=0;n<Nsize;n++)
        codebook1[n][j]=codebook[n][j]-0.5*AA[j];
        sprintf(ch,"Wwcode%d",id);
        stream=fopen(ch,"w");
        fwrite(codebook1,sizeof(float),Nsize*15,stream);
        fclose(stream);

```
/*----------------------------------------------------------------------*/
/* Average_Codeword_Difference.c                                        */
/*----------------------------------------------------------------------*/ include <stdio.h>
include <stdlib.h>
#include <string.h>
#include <math.h>
#include "proto.h"

#define K        15       /* Dimension of vector */
#define Nsize    128      /* Codebook size */
#define Mnf      1        /* Minimum number of frames */

/*----------------------------------------------------------------------*/
int main(int argc,char *argv[])
{
    /*------------------------------------------------------------------*/
    /* Variables                                                        */
    /*------------------------------------------------------------------*/
    FILE    *testfile, *wcodefile, *weifile;
    int     Nf,id,i,j,n,ii,AA,m,num=0,correct=0, Icode[Nsize];
    float   dis2[Nsize][K], vq_error1[Nsize],dis3[K];
    float   **MFCC;
    float   codebook1[Nsize][K],codebook[Nsize][K];
    float   dis,dis1, fmin,vq_error,vq_error2,dummy,wei[K],percent;
    char    filename[30], cb[20],nn[80];

/*------------------------------------------------------------------*/
    /* Read inputs                                                      */
    /*------------------------------------------------------------------*/
    if(argc < 2)
    {
     printf("Usage:    vq testfile\n");
     exit(1);
    } id=atoi(argv[1]);
    printf("id:%i\n",id);
    for(m=2;m<argc;m++)
    {
     if((testfile = fopen(argv[m], "r")) == NULL)
     {
      printf("Error opening file %s !\n",argv[m]);
      continue;
     }

Nf=filelength(argv[m])/(sizeof(float)*K);
     sprintf(filename,"%s",basename(argv[m]));

if(Nf <= Mnf)
     {
      printf("File %s is shorter than %d frames, not be tested.\n",filename,Mnf);
      fclose(testfile);
      continue;
     }
```

*Fig. 5A*

```
num++;
MFCC = float_matrix_2D(Nf,K);
fread((void *)&MFCC[0][0],sizeof(float),Nf*K,testfile);
fclose(testfile);

sprintf(nn,"/disk2/trust2/fangxin/Speech-data/vq5/wcode%d.128",id);

if((wcodefile = fopen(nn,"r")) == NULL)
  {
   printf("Error opening file %s !\n",nn);
   exit(1);
  } fread((void *)&codebook1[0][0],sizeof(float),Nsize*K,wcodefile);
  fclose(wcodefile);

for(ii=0;ii<Nsize;ii++)
    for(j=0;j<K;j++)
      codebook[ii][j]=codebook1[ii][j];

/*----------------------------------------------------------------------*/
/* Calculate quantization errors                                        */
/*----------------------------------------------------------------------*/ vq_error=0.0;
  for(n=0;n<Nf;n++)
  {
   fmin=0.0;
   Icode[n]=0;
   for(j=0;j<K;j++)
   fmin+=(MFCC[n][j]-codebook[0][j])*(MFCC[n][j]-codebook[0][j]);
   fmin=sqrt(fmin)/K;
   for(ii=1;ii<Nsize;ii++)
   {
     dis=0.0;
     for(j=0;j<K;j++)
     dis+=(MFCC[n][j]-codebook[ii][j])*(MFCC[n][j]-codebook[ii][j]);
     dis=sqrt(dis)/K;
     if(dis < fmin)
     { fmin=dis;
       Icode[n]=ii; /* identify the corresponding codeword */

}

}
dis1=0.0;
for(j=0;j<K;j++)
  {
      dis1+=(MFCC[n][j]-codebook[Icode[n]][j])*(MFCC[n][j]-codebook[Icode[n]][j
      dis2[n][j]=(MFCC[n][j]-codebook[Icode[n]][j]);

}
dis1=sqrt(dis1)/K;
```

*Fig. 5B*

```
        /*  printf("Cword:   %d    Iword:  %d     UD:    %f \n", Icode[n], n, dis1); */
          vq_error+=fmin;
        } vq_error/=(float)Nf;

/*    printf("%s: %f\n",argv[m], vq_error); */
        }

/*  for (j=0; j<K; j++)
      {
        for(n=0; n<Nsize; n++)
        vq_error1[j]+=dis2[n][j];
        vq_error1[j]=vq_error1[j]/(float)Nsize;
        printf(" %d th code DD %f\n", j, vq_error1[j]);
        vq_error2+=(vq_error1[j])*(vq_error1[j]);

}
   */
    for (j=0; j<K; j++)
      {
        for (n=0; n<Nsize; n++)
        dis3[j]+=dis2[n][j];
        dis3[j]=dis3[j]/128;
        printf("%2.6f\n ", dis3[j]);
      }

/*    for (n=0; n<Nsize; n++)
      {
         for (j=0; j<K; j++)
        printf("%2.6f ", dis2[n][j]);
         printf("\n");
      } vq_error2=sqrt(vq_error2)/K;
  printf(" DD++:   %f\n", vq_error2);

METHOD FOR FORMING A COHORT FOR USE IN IDENTIFICATION OF AN INDIVIDUAL

TECHNICAL FIELD

This invention relates to a method for forming a cohort for use in identification of an individual, and to a method of identification of an individual on the basis of that cohort. The method is concerned primarily, but not exclusively, with forming a cohort for use in identification of individuals on the basis of the degree of conformity of characteristics of voice sounds, but may be applied to identification on the basis of other characteristics of individuals.

BACKGROUND OF THE INVENTION

In determining whether an individual is or is not a particular pre-identified individual ie a "client", comparison may be made as between pre-determined parameters relating to the pre-determined person and those measured when any individual is presented for verification. Particular parameters which may be used include parameters relating to speech, although parameters relating to other characteristics may be used. Among those other characteristics are parameters relating to how the presenting individual writes, uses a computer mouse, or uses a computer or other keyboard.

One method of identification, or verification, of whether or not an individual presenting for verification is or is not a pre-determined individual makes use of client models representing each of a population of individuals. Characteristics relating to a person presenting for verification are measured and compared with the characteristics for one or more of the total population. If the characteristics for the person presenting for verification match those for a particular one of the population, then the verification system makes a determination that the presenting person is the particular individual for which the characteristics match. A difficulty with systems of this kind is that values for characteristics for any person presenting may differ from reference values for that person which are used by the system. For example, the values for characteristics used by the system would normally comprise stored values measured in a previous test on the individual, the stored value then being compared with those measured when the person presents for verification. However, naturally occurring variations may exist as between those values stored and those which arise when a verification procedure is carried out. In the case of verification on the basis of characteristics relating to utterances of a person, those variations may, for example, comprise phonetic variations, variations due to environmental conditions and intra speaker variations. Thus, a person may utter a vowel in one fashion when the vowel appears in one word, and in a different fashion when it appears in another word. Again, the test conditions under which the original characteristic values were determined may be noise free, but there may be noise present in the environment when the individual presents for verification. Generally, the, it is not surely possible to effect identification simply on the basis of direct equatability of measured characteristics with those stored for the individual in question. Normally, comparison is effected as between characteristic values for more than one of the population, the determination of identity being made on the basis of the "distance" between the characteristics as stored for more than one of the population and those measured at verification. The characteristics which are measured in the verification process may be multi dimensional. For example, it has been found convenient to use cepstral analysis techniques to analyse the speech of a population and the person presenting for verification. Overlapping samples of, say, 30 millisecond may be taken of the amplitude-time wave form recorded during speech. In this case, it is convenient to generate 15 cepstral coefficients and to generate a model representing each member of the population and of the person presenting for verification, the models being 15 dimensional and with, for example, 128 points. The set of such points is commonly referred to as a code book for the person in question.

In the comparison of the code book of the person presenting for verification and those for the reference population employed by the verification technique, one may choose from the code books for the population code books of a "cohort", being a limited number of the population, and then compare the code book of the presenting person with codes books for that cohort. The cohort is selected from the total population on the basis that there is some similarity between the code book for the "client" in the population (ie the person whom the person presenting for verification purports to be) and the relevant cohort members. Selection of the cohort members can be made on the basis of the proximity of the centroids of the code book distributions to the centroid of the client's code book distributions. It is important that the multi-dimensional (Euclidean) distance between the centroid for the client and the various cohort members be significant, but not too great.

While methods based on the above have been found to be workable, hitherto inexplicable errors sometimes arise. For example, an error as basic as failure to discriminate between a male and a female voice may occur. It has now been determined that a likely cause of this difficulty is that the cohorts which are selected for the particular client do not have code book distributions which "surround" the code book distributions for the client in a satisfactory fashion. In particular, if the distance from the centroid of the code book distributions for the person presenting for verification to the client code book distribution centroid is great, then the difference between the distance to the centroids of the code book distributions for the client and for other cohort members will be relatively small. It may easily arise in this case that, because of the distribution of the cohort members with respect to the client, the distance between the code book distribution centroids of the client and of the person presenting for verification is less than the distance from the code book distributions centroid for the person presenting for verification than any of the other cohort members, at least as applies to some particular direction as between the code book distribution centroids for the person presently for verification and for the client and cohorts. Thus, the verification scheme may incorrectly assume that the person presenting for verification is the client in this instance. Merely increasing the number of cohorts will not necessarily rectify this problem.

SUMMARY OF THE INVENTION

In accordance with the present invention, the "coverage" is extended by a) selecting appropriate new cohort members from the population, and/or b) generating from data relating to existing cohort members, including or excluding a particular client, a model for inclusion in the cohort.

More particularly, embodiments of the invention provide methods for synthesising speech models for "phantom" speakers with specified speech characteristics, comprising:

(i) for determining the desired characteristics for each successive cohort member during incremental assembly of a cohort; and/or (ii) constructing synthetic speech models with the desired characteristics.

The synthesised models may be formed from combinations of real speech models. For example, speech events fall into several different classes (volcalic, fricative, nasal, etc.); during the synthesis procedure, those parts of the real speech models pertaining to different classes of speech events may be considered separately. As a result of their method of composition, the synthesised speech models may be representative of possible real speakers.

In one specific aspect, the invention comprises a method of assembling a cohort for a client being one of a population, comprising testing whether models of at least a substantial number (preferably all) of the population excluding the client meet an acceptance threshold test as to identity with a model for the client, determining, from each model meeting the threshold test, whether those models are distributed so as to present at least a substantial probability that models for non-members of the population spaced from the client model in all directions will each be closer to a member of the cohort, excluding the client, than to the client and, if that probability is less than a predetermined value, selecting from the population another cohort member which will reduce that probability.

In another aspect, the invention provides a method of assembling a cohort for a client, being one of a population, comprising testing whether models of at least a substantial number (preferably all) of the population excluding the client meet an acceptance threshold test as to identity with a model for the client, determining, from each model meeting the threshold test, whether those models are distributed so as to present at least a substantial probability that models for non-members of the population spaced from the client model in all directions will each be closer to a member of the cohort, excluding the client, than to the client and, if that probability is less than a predetermined value, generating a new model for inclusion in the population and which will reduce that probability.

In another aspect the invention provides a method of assembling a cohort for a client, being one of a population, comprising testing whether models of at least a substantial number (preferably all) of the population excluding the client meet an acceptance threshold test as to identify with a model for the client, determining, from the or each meeting the threshold test, whether those models are distributed so as to present at least a substantial probability that models for non-members of the population spaced from the client model in all directions will each be closer to a member of the cohort, excluding the client, than to the client and, if that probability is less than a predetermined value, either selecting from the population another cohort member which will reduce that probability or generating a new model for inclusion in the population and which will reduce that probability.

The invention also provides a method of verification using a cohort assembled as above described.

The invention may be practiced with models of different types, for example vector quantisation or hidden Markov models.

BRIEF DESCRIPTION OF THE DRAWINGS

FIG. 3 is a table illustrating Achieved Equal Error Rate percentages.

FIGS. 4A, 4B, and 4C form a listing of a "C" computer program suitable for finding the average vector distance between sets of paired cohorts.

FIGS. 5A, 5B, and 5C form a listing of a "C" computer program suitable for synthesizing codebook distributions for a "phantom" population member.

DETAILED DESCRIPTION OF THE INVENTION

Figure 1:
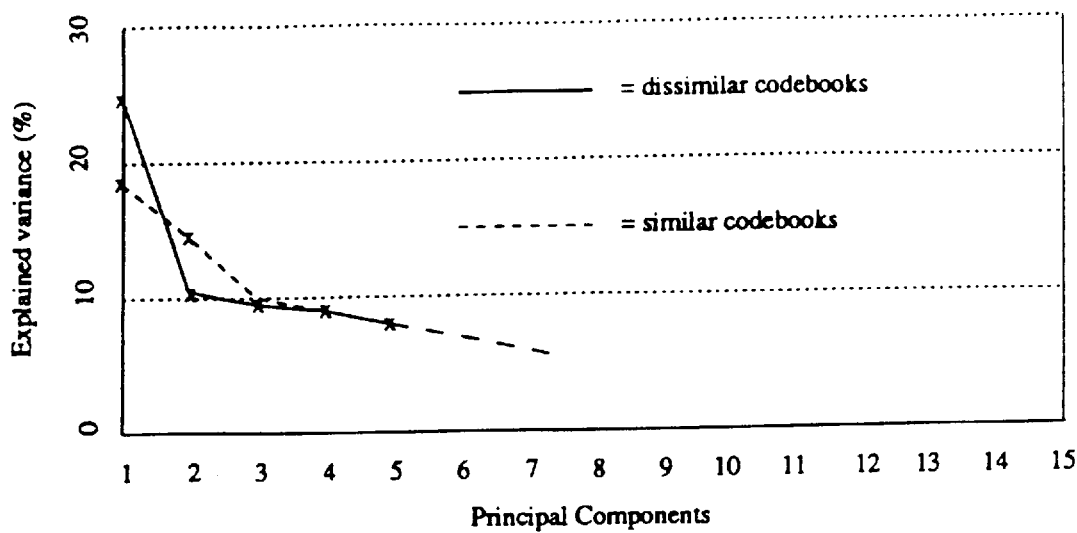
FIG. 1 is a graph plot illustrating analysis of residuals with similar and dissimilar codebooks.

The following detailed description describes in more detail the context of the invention, and preferred features of the invention.

The "cohort normalised" method of speaker verification computes for each input utterance its relative distance from models of the client and a cohort of speakers drawn from the same population. It is assumed that variations which reduce the utterance fit to the client model will tend to have similar effects with respect to the cohort speaker models. The use of "relative distance" can lead to improved client/impostor discrimination.

The following relates to the design of suitable cohorts. Using VQ codebooks in multidimensional cepstral space as the basic speaker models, pairs of codebooks can be related geometrically in terms of vector differences between their centroids in cepstral space. In a well-designed cohort, the cohort members give adequate "coverage" of the client's codebook in multidimensional space.

Cohort members are usually chosen on the basis of their similarity to the client. Experiments in which cohort members were instead chosen according to their position relative to the client led to a slight improvement in verification performance, suggesting that joint consideration of similarity and position would give even better results. However, with a limited set of speakers, it will often be difficult to find cohort members who meet these simultaneous requirements. At least in certain cases it is possible to synthesise suitable "phantom" codebooks based on those of real speakers.

In the classic procedure for speaker verification, an input utterance is accepted or rejected according to a threshold on its goodness of fit with a model of the client's speech. While such a measure truly reflects absolute deviations between the client's model and input utterances, it is sensitive to overlapping client and impostor distributions which arise because of the effects of intra-speaker variation, recording environment change and phonetic variation. This in turn leads to a high Equal Error Rate (EER).

An alternative approach (Rosenberg et al., 1992) uses a "cohort" of speakers, with speech models similar to that of the client, allowing relative measures of similarity or difference to be computed and reducing problems due to the above-mentioned variations. Similarity is judged on the basis of the mean distortion of a potential cohort speaker's utterances with respect to the client speaker's VQ model.

Tests of the cohort method show that it is subject to problems with false acceptance of impostor utterances which are quite dissimilar to those of the client (eg. from a speaker of opposite sex to the client) but which still give a better fit to the client model than to any of the cohort models. A tentative geometrical explanation of this problem has been given in Chen, F., Millar, B. and Wagner, M. (1994), "Hybrid threshold approach in text-independent speaker verification," *Proc. Int. Conf. on Spoken Language Processing*, Yokohama, 1855–1858, suggesting that the problem arises from inadequate "coverage" of the client by cohort members. Thus, a significant practical difficulty associated with use of the cohort-normalised method is that of assembling a suitable cohort from among the set of individuals whose speech has been modelled. In many cases, this set will be too small and for certain clients will not include a suitable set of speakers with similar speech models from which to assemble a cohort. Choice of suitable cohort members needs to be based on an understanding of the relationship between pairs of codebooks. Unless suitable potential cohort members are available and the cohort members are selected carefully, anomalous verification behaviour may result (e.g. an impostor of the opposite sex being verified as the client). Verification performance tends to improve with cohort size, but this increases verification time. By appropriate choice of cohort members, one can form a cohort of minimum size for a specified level of performance.

The techniques covered of the present invention directly address practical difficulties associated with assembling a suitable cohort for each client in the absence of a large set of speech models from which to select cohort members. Speakers may, in the following, be considered to be characterised by codebooks of 128 codewords (vectors in 15-D mel-frequency cepstral space) chosen such as to minimise the encoding error (distortion) with the training data sets. The number of muscle groups used in articulating speech sounds is much less than 15. Most of the relevant information for phonetic discrimination in the speech of two males can be represented with about six cepstral coefficients Davis, S. B. and Mermelstein, P. (1980), "Comparison of parametric representations for monosyllabic word recognition in continuously spoken sentences," *IEEE Trans. Acoustics, Speech and Signal Processing*, Vol. ASSP-28, 357–366. High-dimensional cepstral data relating to vocalic speech tends to fall on low-dimensional quadratic surfaces (predominantly parabolic) which can be characterised in terms of only four parameters Hawkins, S., Macleod, I. and Millar, B. (1994), "Modelling individual speaker characteristics by describing a speaker's vowel distribution in articulatory, cepstral and formant space," *Proc. Int. Conf. on Speech Science and Technology*, Perth. Important components of the codeword distributions will thus have lower intrinsic dimensionality than that of their space of representation; the overall distributions can thus be expected to show significant clustering in cepstral space.

The similarity of a pair of codebooks may be assessed by measuring the distortion when one codebook is used to encode the speech data on which it was trained, and then to compare this to the distortion obtained with this data using the other codebook. Given that the codebooks for all speakers have been trained on the same set of utterances, the regions most densely occupied by codewords should be similar for pairs of similar codebooks.

The similarity of codebooks measured in such a way represents the similarity of speakers. The ratio of distortions is a scalar magnitude; as a directionless quantity it thus gives no indication as to which of two given codebooks would yield the smaller distortion when encoding the training data for a third, for example. As a similarity measure it provides an estimate of how "close" the regions of cepstral space occupied by the two codebooks are, but it does not indicate their relative positions. Scalar measures are thus of only limited use in diagnosing problems with a given cohort or in choosing cohort members for a given client.

A simple vector measure considers the relative differences between codebook centroids (formed from the average of all vectors in a codebook). While pairs of speaker models which give relatively small errors in encoding each other's training data will have similar distributions of codewords in cepstral space, with pairs of similar codebooks there may still be considerable interspersion of codewords. The question arises as to whether any differences (in magnitude and direction) between the centroids of such codebooks are meaningful in the statistical sense. Given the inhomogeneity and complexity of the codeword distributions in cepstral space, simple statistical characterisations (based on variances of these distributions) are not appropriate for answering this question. An alternative method associates the codewords in one book with neighbours in the other (eg. on the basis of closest Euclidean distance, as used in the following) and then analyses the distributional properties of the resulting set of 128 difference vectors, to see if they cluster in particular directions. A method for analysing these properties is next described.

A method to test the statistical significance of vectorial relationships between codebooks is now developed. The analysis of the difference vectors comprises the following steps:

(i) determine a mean directional component;
(ii) test the statistical significance of this component; and
(iii) subtract the mean from all vectors before analysing the residuals with Principal Components Analysis (PCA).

The mean vector between codeword pairs can simply be shown to be equal to the vector between the corresponding codebook centroids. PCA is used to check to what extent directional variability between codeword pairs is concentrated in a few directions.

Distributions of difference vectors with relatively similar and dissimilar pairs of codebooks have been analyses in accordance with the principles of this invention (with similarity being assessed in terms of average distortion), using Hotelling's $T^2$ statistic to test the hypothesis that the mean vector of the difference vectors was non-zero. For all pairs of codebooks examined, the hypothesis was confirmed ($p<0.0001$) showing that the difference vectors tend to point in a consistent direction. As a result of the low intrinsic dimensionality of the cepstral distributions of vocalic speech (Hawkins, Macleod and Millar, 1994), a significant proportion of the codewords will tend to cluster on hypersurfaces of lower dimensionality. If, however, there was substantial interspersion of the codeword distributions in the codebooks being compared, the difference vectors would have a less consistent orientation. The results of the analysis performed in this embodiment of the invention show that the degree of interspersion is limited, thus indicating that distributions of codewords from similar codebooks have similar shapes and that the concept of relative displacements between codebook pairs has statistical validity. After subtracting the mean vector from each difference vector, analysis of the residuals with PCA revealed one distinct non-noise directional component with dissimilar pairs of codebooks and two orthogonal components with similar codebook pairs (one component being somewhat larger than the other). This is shown in FIG. 1 which illustrates analysis of residuals with similar and dissimilar codebooks.

The presence of non-noise Principal Components in the residuals, after the mean vector is subtracted, means that there are further systematic variations in the relationships between pairs of codeword distributions in addition to the mean displacement. Two codebooks with similar centroids may thus give large distortions when encoding each other's training data (eg. if one codebook had a greater span in certain directions than the other).

An estimate of progress towards explaining the total relationship between two codebooks is obtainable by computing the length of the (vector) sum of the difference vectors and comparing this to the sum of the scalar lengths of the individual vectors. If all difference vectors point in the same direction, these two lengths will be the same. If the difference vectors are randomly oriented, the summed vector length will be only a small fraction of the scalar sum of lengths. On examining the codebooks of potential cohort members in relation to given client codebooks, it was found that this length ratio varied from about 25% to 40%, a much larger than expected length for the sum of random vectors. In addition to supporting the statistical finding that the difference between codebook centroids is real, this result means that a large enough component of the total relationship is captured that clear benefits should follow from taking relative codebook positions into account when constructing cohorts.

The above provides statistical justification for using relative centroid positions to consider the extent to which the members of a cohort "enclose" a client or leave "gaps" in the coverage, given possible interspersion of the codeword distributions of similar speakers. The minimum distortion among the cohort models and the mean distortion across cohort models have both been proposed for use in the client/cohort comparison. The following tests are based on use of the min statistic.

Figure 2:
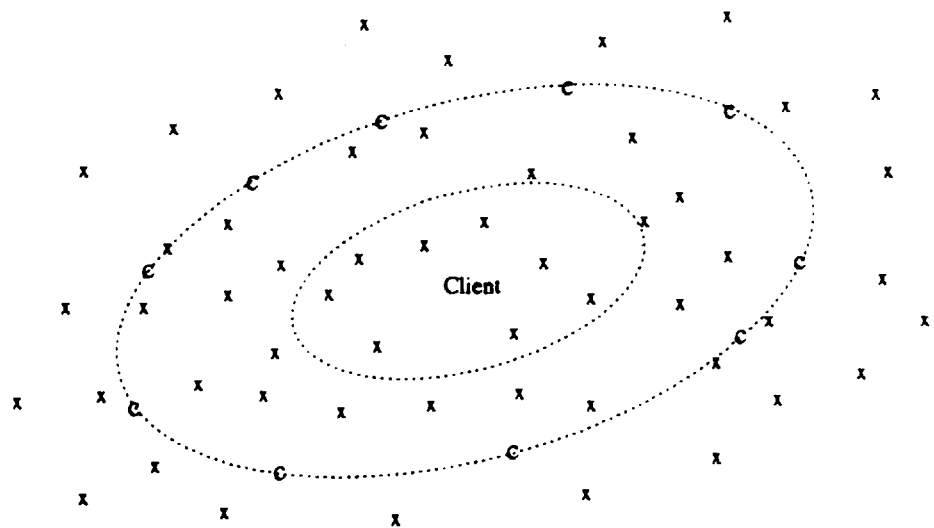
FIG. 2 is a diagram depicting a hyperellipsoid concentric with a client containing centroids of codebooks for speakers similar to the client.

An optimal cohort is one in which for each potential impostor there is a cohort member whose codebook encodes impostor utterances with lower distortion than that achieved with the client's codebook. Care is needed not to falsely reject the client's speech, so such cohort codebooks need to encode the client's training data with a significantly (but not dramatically) larger distortion than that obtained with the client's codebook: The cohort members should be similar, but not too similar, to the client. A percentage of impostors with speech very similar to the client will thus be falsely accepted, but this is unavoidable. Referring to FIG. 2, imagine a hyperellipsoid (concentric with the client), which contains the centroids of codebooks for speakers similar to the client. The members of one potential cohort could then be distributed on the surface of a second larger hyperellipsoid with roughly twice the diameters of the first, so that (on average) utterances made by speakers whose codebook centroids lay outside the first hyperellipsoid would be attributed to a cohort member, and utterances made by speakers whose codebook centroids lay inside would be attributed to the client. By varying the size of the smaller hyperellipsoid, achieve the desired balance between Type I and Type II errors can be achieved. (Hyperellipsoids are advanced here instead of hyperspheres, because of the fact that other codebooks are unlikely to be evenly distributed about the client's.)

In the usual case, only a limited set of speakers (and their trained codebooks) will be available for cohort construction. The most similar speakers in this set to a given client may well be less (or sometimes more) similar than desired. Nevertheless, a functional cohort of size N can be formed by choosing the N most similar codebooks. Just as the codeword distributions themselves will be of lower intrinsic dimensionality than that of the representation space, it might be expected that the relative positions of codebook centroids (and thus of cohort members) will also be unevenly distributed. For example, cepstral features will tend to vary in a systematic manner with changes in parameters such as vocal tract length and shape.

In terms of geometric analogy, anomalous acceptance of dissimilar impostors with a cohort chosen from the speakers most similar to the client arises because the client is "covered" too sparsely or too unevenly. An alternative procedure for assembling a cohort is as follows. Choose a speaker who is similar (but not too similar) to the client as the first cohort member. Test the remaining speaker population to see which speaker (of about the desired similarity to the client) gives the highest percentage of false acceptances with this cohort of size one. This speaker will lie in a direction which is not well covered by the first cohort member and is chosen as the second cohort member. The procedure is repeated until a cohort of the required size has been formed.

Speech data useful in practicing the invention is described in Millar, B., Chen, F., Macleod, I., Ran, S., Tang, H., Wagner, M. and Zhu, X. (1994), "Overview of speaker verification studies towards technology for robust user-conscious secure transactions," *Proc. Int. Conf. on Speech Science and Technology*, Perth. The population of 45 speakers is divided into two—a cohort formation population of 25 speakers and a client/test population of 20 speakers (10 male and 10 female). Using the method of assessment outlined in Millar, B., Chen, F. and Wagner, M. (1994), "The efficacy of cohort normalisation in a speaker verification task under different types of speech signal variance," *Proc. Int. Conf. on Speech Science and Technology*, Perth, a test was made of the verification performance of cohorts assembled (i) from the speakers most similar to the client, and (ii) by starting with the most similar speaker to the client, adding the speaker who gave the greatest number of false acceptances with this cohort of size one, and so on as each new member was added. Because of the limited speaker population available, the similarity of cohort members to the client was not considered in building up the cohort using the "optimum direction" method (which was intended to identify and then fill gaps in the cohort coverage of the client). The results given in Table 1 show a slight advantage for the direction method, even though (apart from the first cohort member) similarity to the client was not considered. For several clients, the EER with the "optimum direction" procedure increased slightly as the cohort size increased from three to five; in this case the final one or two cohort members chosen must have led to false rejections of the client (ie. these members were too similar to the client).

Analysis of the EERs achieved with Min5 and Sel5 showed that the observed improvement with Sel5 was not statistically significant. Thus these experiments indicate that the direction and similarity methods produce cohorts of similar quality. Given the different basis of these two methods of assembling cohorts, simultaneous consideration of both coverage and similarity may improve overall performance.

Given the difficulties encountered with locating suitable cohort members (because of the limited population of speakers), the question arises as to whether it is possible to form synthetic codebooks with the desired properties. For example, it would be possible to modify the client's codebook to get a new codebook which is just sufficiently dissimilar (ie. gives the desired amount of distortion when encoding the client's training data with respect to the balance of Type I and Type II errors). For example, it would be possible to disturb 1 or more of the 15 coefficients in each codeword at a time to yield synthetic cohorts displaced a desired distance from the client in the direction of the altered coefficients. Experiments showed that codebooks synthesised in this manner had little practical utility—they usually did not encode impostor utterances as efficiently as the client's codebook and thus did not lead to improvements in speaker verification performance. The source of the problem here is the use of codeword distributions which are most likely densely clustered in only a small region of the 15-D cepstral space. In synthesising "phantom" codebooks we need to ensure that the synthetic codewords are representative of those of typical speakers similar to the client. Working in a space which is known to be inhomogeneously occupied, we can minimise errors arising from inhomogeneities by using codeword pairs from similar real speakers and interpolating synthesised values, thereby staying "close" to known real values.

Experiments in synthesising codebooks by either adding or subtracting a fixed vector displacement to or from all codewords in a real speaker's codebook, either the client's or a (potential) cohort member's, were instructive. The fixed displacement was usually 50% of the difference vector between the client's and cohort's codebook centroids. In a typical example, the client's codebook encoded a set of test client utterances with a distortion of 2783, the cohort's codebook gave a distortion of 3323, the client's codebook displaced by either + or −50% of the difference vector between the centroids gave distortions of 2811 and 2799 respectively, and the cohort's codebook displaced by + or −50% of this difference vector gave distortions of 3422 and 3255 respectively. Two points to be noted here are that (i) the observed increases and decreases in distortion are consistent with our geometric interpretation, and (ii) when the client codebook is displaced halfway towards the cohort, the distortion increases but is still substantially smaller than the (reduced) distortion obtained when the cohort codebook is displaced halfway towards the client.

The second point above provides further evidence that the distributions of codewords vary in ways other than overall position—speakers are characterised by the shapes of their codeword distributions as well. A second method of interpolation was thus tried, which aimed to indirectly capture something of these other dimensions of variation. Instead of adding a fixed vector displacement to all codewords, interpolation (or extrapolation) was affected on the basis of individual difference vectors between codeword pairs. As an increasing percentage of these difference vectors are added to the codewords in the client codebook, so the synthesised codebook will gradually change from one that is similar to the client codebook into one that is similar to the cohort codebook. For the example client and cohort codebooks considered above, a synthetic codebook interpolated using 50% of the individual difference vectors for codeword pairs gave a distortion of 3078, which was close to halfway (3053) between the respective client and cohort distortions of 2784 and 3323.

FIG. 3 illustrates Achieved Equal Error Rate percentages with an absolute threshold (ABS_VQ) and with selected cohorts of size n chosen conventionally (Minn) and according to false acceptances (Seln). The final column (Sel5') shows the improved results obtained with several clients (marked with *) through use of a final synthetic cohort member. This demonstrates that with some clients the EER increased from Sel4 to Sel5. In these cases, the chosen fifth cohort member was used to construct an extrapolated synthetic codebook (moving the chosen cohort codebook further away from the client) and recalculated the EER (shown as Sel5'). In all cases this procedure prevented the EER from increasing between Sel4 and Sel5'; in two cases (clients 19 and 20) the synthetic cohort member reduced the EER between Sel4 and Sel5'. The reduction in the overall error rate to 2.83% was not, however, sufficient to make the difference between Min5 and Sel5' statistically significant.

The overall results of the experiments provide evidence that the distributions of codewords in 15-D MFCC space are rather complex. Although it can be shown statistically that the observed mean displacements between similar codebooks are real and do not occur just by chance, the distributions of codewords in given codebooks will vary in shape and extent as well as position. The present concept of relative codebook positions captures an important part, but only a part, of the total relationship between similar codebooks.

The listing shown in FIGS. 4A–4C is for a "C" computer program suitable for finding the average vector distance between sets of paired cohorts.

The program listing shown in FIGS. 5A–5C is for a "C" program suitable for synthesizing codebook distributions for a "phantom" population member.

We claim:

1. A method of assembling a cohort for a client being one of a population, comprising testing whether models related to the population excluding the client meet an acceptance threshold test as to identity with a model for the client, determining, from each model meeting the threshold test, whether those models are distributed so as to present at least a given probability that models for non-members of the population spaced from the client model in all directions will each be closer to a member of the cohort, excluding the client, than to the client and, if that probability is less than a predetermined value, selecting from the population another cohort member which will reduce that probability.

2. The method as claimed in claim 1 wherein said models related to the population excluding the client comprises all of the population excluding the client.

3. The method as claimed in claim 1 wherein said models are codebooks each of a number of codewords.

4. The method as claimed in claim 3 wherein said testing is effected by assessing a distance between centroids of pairs of the codebooks.

5. The method as claimed in claim 3 wherein said testing is effected by assessing a distance between codewords in one said codebook and neighbour codewords in another said codebook.

6. The method as claimed in claim 4 wherein the distance is a Euclidean distance.

7. The method of claim 5 wherein the distance is a Euclidean distance.

8. The method of claim 1, further comprising:
    (a) choosing a first model among models of the population not including the client model, said first model being similar to but still exhibiting significant differences with respect to the client model,
    (b) adopting said test model as a first member of the cohort,
    (c) testing the remaining models for the population, excluding the client and first models, to determine a further model, among those of the remaining models which have a degree of similarity to the client model similar to that which exists between the first and client models, which provides the highest degree of false acceptances with respect to the client,
    (d) adding said further model to said cohort, and
    (e) repeating steps (c) and (d) using all models previously added to the cohort and the client model to generate successive other further models which are added to the cohort.

9. The method of claim 1 wherein the models are vector quantization or hidden Markov models.

10. The method of claim 1 wherein said models represent speech characteristics.

11. The method of claim 1, further comprising comparing a model relating to said person with said cohort and determining whether the person is the client on the basis of similarity of the models relating to the person and to the cohort.

12. The method of assembling a cohort for a client being one of a population, comprising testing whether models related to the population excluding the client meet an acceptance threshold test as to identity with a model for the client, determining, from each model meeting the threshold test, whether those models are distributed so as to present at least a given probability that models for non-members of the population spaced from the client model in all directions will each be closer to a member of the cohort, excluding the client, than to the client and, if that probability is less than a predetermined value, generating a new model for inclusion in the population and which will reduce that probability.

13. The method as claimed in claim 12 wherein said models related to the population excluding the client comprises all of the population excluding the client.

14. The method as claimed in claim 12 wherein said models are codebooks each of a number of codewords.

15. The method as claimed in claim 14 wherein said testing is effected by assessing a distance between centroids of pairs of the codebooks.

16. A method as claimed in claim 14 wherein said testing is effected by assessing a distance between codewords in one said codebook and neighbour codewords in another said codebook.

17. The method as claimed in claim 15 wherein the distance is a Euclidean distance.

18. The method of claim 16 wherein the distance is a Euclidean distance.

19. The method of claim 14 wherein the new model is generated by adding or subtracting a fixed vector displacement to the codewords of models in the population excluding any generated models.

20. The method of claim 12 wherein the models are vector quantization or hidden Markov models.

21. The method of claim 12 wherein said models represent speech characteristics.

22. The method of claim 12, further comprising comparing a model relating to said person with said cohort and determining whether the person is the client on the basis of similarity of the models relating to the person and to the cohort.

23. A method of assembling a cohort for a client being one of a population, comprising testing whether models related to the population excluding the client meet an acceptance threshold test as to identity with a model for the client, determining, from each meeting the threshold test, whether those models are distributed so as to present at least a given probability that models for non-members of the population spaced from the client model in all directions will each be closer to a member of the cohort, excluding the client, than to the client and, if that probability is less than a predetermined value, either selecting from the population another cohort member which will reduce that probability or generating a model for inclusion in the population and which will reduce that probability.

24. The method as claimed in claim 23 wherein the models are vector quantisation or hidden Markov models.

25. The method as claimed in claim 23 wherein said models represent speech characteristics.

26. The method of claim 23, further comprising comparing a model relating to said person with said cohort and determining whether the person is the client on the basis of similarity of the models relating to the person and to the cohort.

* * * * *